United States Patent
McLees et al.

(10) Patent No.: US 10,175,694 B2
(45) Date of Patent: Jan. 8, 2019

(54) FLIGHT CONTROL SYSTEM WITH SYNTHETIC INERTIAL LOCALIZER DEVIATION AND METHOD OF USE

(71) Applicant: THE BOEING COMPANY, Chicago, IL (US)

(72) Inventors: Robert E. McLees, Kirkland, WA (US); Robert Erik Freeman, Seattle, WA (US); Prachya Panyakeow, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 24 days.

(21) Appl. No.: 15/340,318

(22) Filed: Nov. 1, 2016

(65) Prior Publication Data
US 2018/0120849 A1 May 3, 2018

(51) Int. Cl.
| | |
|---|---|
| *G05D 1/02* | (2006.01) |
| *G08G 5/02* | (2006.01) |
| *B64D 45/04* | (2006.01) |
| *G01C 21/16* | (2006.01) |
| *G01C 23/00* | (2006.01) |

(52) U.S. Cl.
CPC ............ *G05D 1/0202* (2013.01); *B64D 45/04* (2013.01); *G01C 21/165* (2013.01); *G01C 23/005* (2013.01); *G08G 5/02* (2013.01)

(58) Field of Classification Search
CPC ............................... G08G 5/02; G05D 1/0202
See application file for complete search history.

(56) References Cited

U.S. PATENT DOCUMENTS

| | | | |
|---|---|---|---|
| 3,818,476 | A | 6/1974 | Coulter et al. |
| 4,311,466 | A | 1/1982 | Carpenter et al. |
| 3,041,607 | A | 6/1982 | Rhodes et al. |
| 4,399,425 | A | 8/1983 | Taylor |
| 4,429,312 | A | 1/1984 | Chisholm |
| 4,534,000 | A | 8/1985 | Bliss |
| 4,567,483 | A | 1/1986 | Bateman et al. |
| 4,680,587 | A | 7/1987 | Chisholm |
| 4,916,612 | A | 4/1990 | Chin et al. |
| 5,387,863 | A | 2/1995 | La et al. |
| 5,523,949 | A | 6/1996 | Agate et al. |
| 5,745,054 | A | 4/1998 | Wilkens |
| 5,786,773 | A | 7/1998 | Murphy |
| 6,178,363 | B1 | 1/2001 | McIntyre et al. |

(Continued)

FOREIGN PATENT DOCUMENTS

| | | |
|---|---|---|
| EP | 0315227 A2 | 5/1989 |
| EP | 2511733 A2 | 10/2012 |
| EP | 2765389 A1 | 8/2014 |

OTHER PUBLICATIONS

Extended European Search Report for Application No. 17190618.3, dated Feb. 23, 2018, 9 pages.

(Continued)

*Primary Examiner* — Michael D Lang
(74) *Attorney, Agent, or Firm* — Armstrong Teasdale LLP

(57) ABSTRACT

A flight control module for computing localizer deviation during landing of an aircraft is provided. The flight control module includes a communication interface and a processor. The communication interface is configured to receive inertial data for the aircraft. The processor is coupled to the communication interface and is configured to compute an inertial localizer deviation based on the inertial data.

20 Claims, 5 Drawing Sheets

(56) References Cited

U.S. PATENT DOCUMENTS

| | | |
|---|---|---|
| 6,606,545 B1 | 8/2003 | McCall et al. |
| 7,546,183 B1 | 6/2009 | Marcum |
| 7,619,556 B1 | 11/2009 | McCusker |
| 7,917,254 B2 | 3/2011 | Krough |
| 7,941,251 B2 | 5/2011 | Krough et al. |
| 8,035,547 B1 | 10/2011 | Flanigan et al. |
| 8,160,758 B2 | 4/2012 | Call et al. |
| 8,630,756 B2 | 1/2014 | Fleiger-Holmes et al. |
| 8,698,655 B2 | 4/2014 | Flanigan et al. |
| 8,798,820 B2 | 8/2014 | Hooks |
| 9,098,999 B2 | 8/2015 | Snow et al. |
| 9,257,050 B2 | 2/2016 | Fleiger-Holmes et al. |
| 2007/0020588 A1 | 1/2007 | Batcheller et al. |
| 2009/0069960 A1 | 3/2009 | Lapp et al. |
| 2010/0017053 A1 | 1/2010 | Krogh et al. |
| 2012/0265376 A1 | 10/2012 | Fleiger-Holmes et al. |
| 2013/0041529 A1 | 2/2013 | He et al. |
| 2013/0289802 A1 | 10/2013 | Beaufrere |
| 2014/0229039 A1 | 8/2014 | Murphy |
| 2014/0288733 A1 | 9/2014 | He et al. |
| 2016/0012735 A1 | 1/2016 | Koukol et al. |

OTHER PUBLICATIONS

Extended European Search Report for Application No. 17190626.6, dated May 28, 2018; 7 pages.

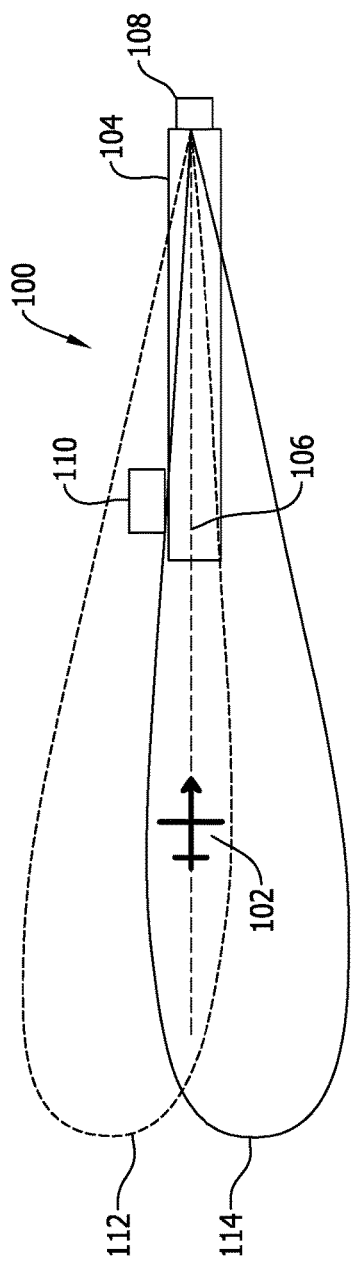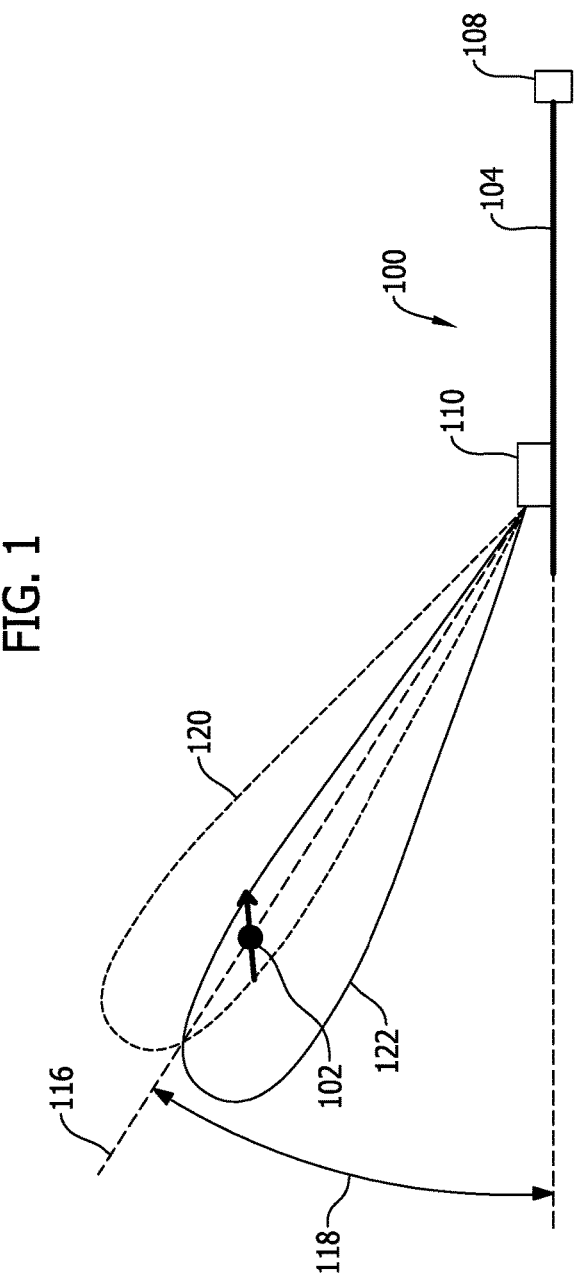

FLIGHT CONTROL SYSTEM WITH SYNTHETIC INERTIAL LOCALIZER DEVIATION AND METHOD OF USE

BACKGROUND

The field of the disclosure relates generally to flight control systems and, more specifically, to a flight control module utilizing a synthetic inertial localizer deviation.

Many known aircraft feature an automated landing system that controls the aircraft during landing. Automated landing systems have become increasingly more common and are frequently relied on for both instrument landings under instrument flight rules (IFR) and landings performed under visual flight rules (VFR). Known automated landing systems utilize various receivers, such as multi-mode receivers (MMRs), for example, to receive guidance signals transmitted from the ground. Such guidance signals may include, for example, instrument landing system (ILS) signals, global positioning service (GPS) landing system (GLS) signals, and/or microwave landing system (MLS) signals. The guidance signals inform the aircraft of its position relative to a desired vertical and lateral path to the runway and through roll-out after touchdown. The desired vertical path is referred to as the glideslope and the lateral path is referred to as the localizer. The glideslope is typically defined as a 3° descent with a desired intercept with the ground at 1000 feet beyond the runway threshold. The localizer guides the aircraft to the runway centerline.

The guidance signals transmitted from the ground are received by an on-board antenna and routed to redundant MMRs. Each MMR computes a localizer deviation and a glideslope deviation that are routed to a flight control module that includes the automated landing system. The localizer deviation is an indication of the aircraft's position relative to the desired path to the runway centerline. For example, the localizer deviation may indicate the aircraft is approximately 2° left of the runway centerline. The glideslope deviation is an indication of the aircraft's position relative to the desired glideslope to the runway. For example, the glideslope deviation may indicate the aircraft is 1° below the desired glideslope. The flight control module uses the localizer deviation and the glideslope deviation to adjust the automated landing system and to command control surfaces of the aircraft.

Many known automated landing systems require three independently computed localizer and glideslope deviations. Such redundancy ensures that if one localizer deviation or one glideslope deviation fails, the automated landing system still has two good signals to control the aircraft. The redundant equipment necessary for independently computing three localizer and glideslope deviations adds cost and weight to the aircraft. If the available localizer deviation and glideslope deviations disagree beyond a predetermined threshold, the automated landing system forfeits control of the aircraft to the pilot. The availability of reliable, i.e., "good," localizer deviation and glideslope deviation signals is particularly important when the aircraft descends below 200 feet, because the margins for error are tighter and errant control by the automated landing system may result in the aircraft missing the runway. Accordingly, when failures or erroneous localizer or glideslope signals are detected, the flight control system relies on the good localizer and glideslope signals or forfeits control to the pilot.

BRIEF DESCRIPTION

According to one aspect of the present disclosure, a flight control module for computing localizer deviation during landing of an aircraft is provided. The flight control module includes a communication interface and a processor. The communication interface is configured to receive inertial data for the aircraft. The processor is coupled to the communication interface and is configured to compute an inertial localizer deviation based on the inertial data.

According to another aspect of the present disclosure, a flight control system for landing an aircraft is provided. The flight control system includes a communication bus, first and second multi-mode receivers (MMRs), and a flight control module. The first and second MMRs are coupled to the communication bus and are configured to compute first and second localizer deviations based on received localizer signals. The first and second MMRs are further configured to transmit first and second localizer deviation signals indicative of the first and second localizer deviations onto the communication bus. The flight control module is coupled to the communication bus and is configured to receive inertial data for the aircraft and the first and second localizer deviation signals over the communication bus. The flight control module is further configured to compute an inertial localizer deviation based on the inertial data. The flight control module is further configured to select one localizer deviation from among the first and second localizer deviations and the inertial localizer deviation. The flight control module is further configured to transmit the one localizer deviation to an automated landing system for the aircraft.

According to yet another aspect of the present disclosure, a method of detecting a localizer deviation for an aircraft during landing is provided. The method includes receiving instrument landing system (ILS) localizer signals. The method further includes computing MMR localizer deviations based on the ILS localizer signals. The method further includes filtering the MMR localizer deviations. The method further includes initializing an inertial localizer deviation computation based on a filtered MMR localizer deviation. The method further includes integrating inertial data, generated by an inertial reference unit (IRU) for the aircraft, from the filtered MMR localizer deviation to generate an inertial localizer deviation at the IRU. The method further includes translating the inertial localizer deviation at the IRU to a guidance control point (GCP).

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 1 is a top perspective diagram of an exemplary instrument landing system (ILS) for use in landing an aircraft;

FIG. 2 is a side perspective diagram of the exemplary ILS shown in FIG. 1;

DETAILED DESCRIPTION

Figure 3:
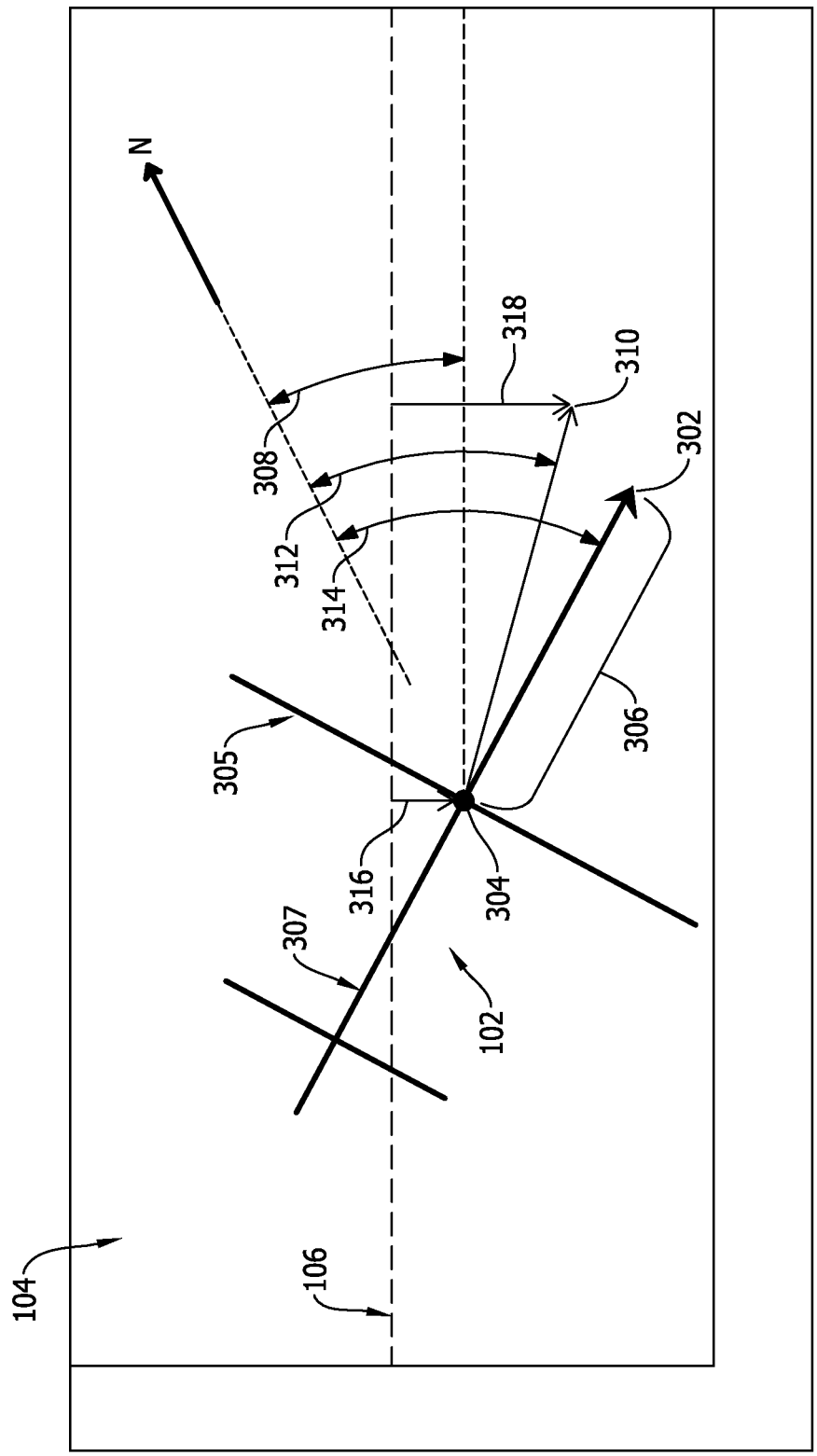
FIG. 3 is a top perspective diagram of the aircraft shown in FIGS. 1 and 2 during landing.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

FIG. 1 is a perspective diagram, from a top-view, of an exemplary instrument landing system (ILS) 100 for use in landing an aircraft 102. FIG. 2 is another perspective diagram, from a side view, of ILS 100. Aircraft 102 is illustrated during approach for landing on a runway 104. Runway 104 is characterized by a runway centerline 106 that extends towards and beyond aircraft 102 for illustrative purposes.

Referring to FIG. 1, in the exemplary embodiment, ILS 100 includes a localizer transmitter 108 and a glideslope transmitter 110. Localizer transmitter 108 transmits a first localizer beam 112 and a second localizer beam 114 towards aircraft 102. First localizer beam 112 and second localizer beam 114 cooperate define an ILS localizer signal that is received by aircraft 102 and processed to generate localizer deviations indicative of the lateral position of aircraft 102 relative to runway centerline 106. The localizer signals are typically used to control aircraft 102 through landing and rollout, i.e., deceleration along runway prior to taxi.

Referring to FIG. 2, aircraft 102 approaches runway 104 along a predefined glideslope 116 that intercepts runway 104 at a predefined distance beyond a runway threshold for runway 104. The predefined distance is typically, for example, at least 1000 feet from the runway threshold, which is typically the site of glideslope transmitter 110. Glideslope 116 is defined by a glideslope angle 118 measured between glideslope 116 and runway 104. A typical glideslope, for example, is defined by glideslope angle 118 being equal to approximately 3°. Glideslope transmitter 110 transmits a first glideslope beam 120 and a second glideslope beam 122 towards aircraft 102. First glideslope beam 120 and second glideslope beam 122 define an ILS glideslope signal that is received by aircraft 102 and that is processed to generate glideslope deviations indicative of the vertical position of aircraft 102 relative to glideslope 116. The glideslope signals are typically used to control aircraft 102 until it reaches a flare altitude, i.e., an altitude when the nose of aircraft 102 pitches up prior to landing, which typically occurs between 50 and 75 feet. When the flare altitude is reached, aircraft 102 typically switches to a radio altimeter to guide aircraft 102 to runway 104 for landing. In alternative embodiments, flare altitude may be greater than 75 feet or, in some embodiments, below 50 feet.

FIG. 3 is a perspective diagram of aircraft 102 during landing. FIG. 3 illustrates a top-view of aircraft 102 landing on runway 104. Aircraft 102 includes a guidance control point (GCP) 302 to which all flight control commands for aircraft 102 are referenced. GCP 302 is typically located at the nose of aircraft 102. Aircraft 102 also includes an inertial reference unit (IRU) 304 that includes various sensors for detecting linear and angular accelerations of aircraft 102, which are translatable to accelerations, velocities, and attitude of aircraft 102 along three axis, i.e., pitch, roll, and yaw. IRU 304 is typically located at or near the center of aircraft 102, which is illustrated in FIG. 3 as the intersection of the wings 305 and fuselage 307 of aircraft 102. Accordingly, GCP 302 and IRU 304 are typically separated by a distance 306 extending along a portion of the length of fuselage 307 of aircraft 102.

Runway 104 includes runway centerline 106 characterized by a runway heading 308 relative to magnetic North (N). Runway heading 308 is generally known by aircraft 102 and its navigations systems, and is sometimes referred to as a magnetic runway heading. During landing, aircraft 102 travels at a ground speed 310 along a track angle, or simply track 312, relative to North. Ground speed 310 and track 312 are measurable by IRU 304. Moreover, aircraft 102 travels with an aircraft heading 314 relative to North, which is generally defined as the direction the nose of aircraft 102 is pointing. Aircraft heading 314 is also measurable by IRU 304. Notably, under certain circumstances, such as crosswinds, for example, track 312 and aircraft heading 314 may be different.

FIG. 3 illustrates aircraft 102 at an orientation with a localizer deviation 316 measured from runway centerline 106 to IRU 304. Given inertial accelerations measured by IRU 304 and runway heading 308, aircraft 102 may compute an inertial cross-runway velocity 318 that, over time, increases or decreases localizer deviation 316 and that can be translated to GCP 302.

Figure 4:
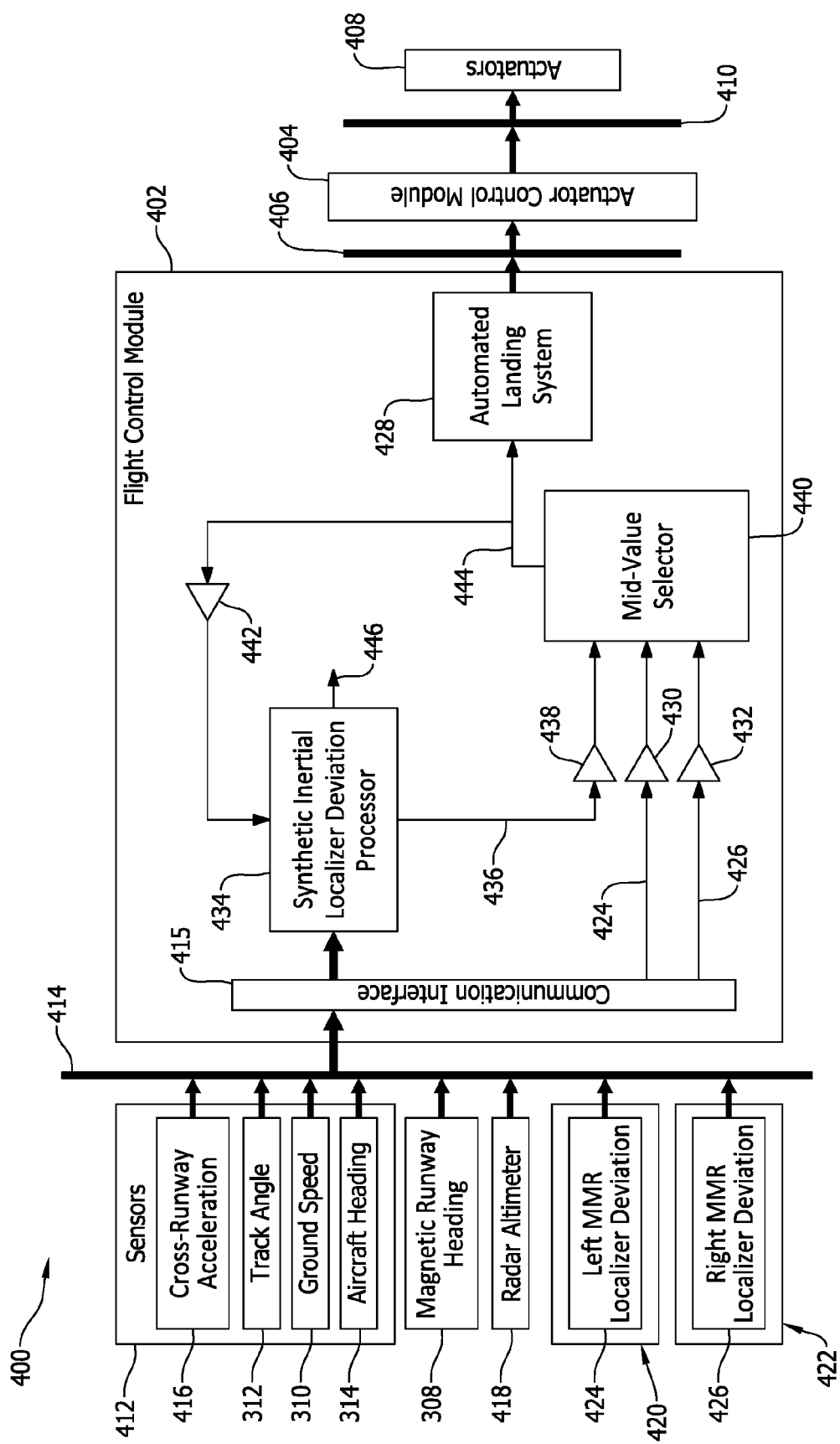
FIG. 4 is block diagram of an exemplary flight control system for the aircraft shown in FIGS. 1-3.

FIG. 4 is block diagram of an exemplary flight control system 400 for aircraft 102, shown in FIGS. 1-3. Flight control system 400 includes a flight control module 402 that controls aircraft 102 by transmitting commands to an actuator control module 404. Flight control module 402 communicates with actuator control module 404 over a communication bus 406. Actuator control module 404 controls one or more actuators 408 that are attached to various flight control surfaces of aircraft 102. Actuator control module 404 communicates with actuators 408 over a communication bus 410.

Aircraft 102 includes various sensors 412 that measure flight parameters and generate data that is transmitted onto a communication bus 414. Flight control module 402 is communicably coupled to communication bus 414 through communication interface 415 and gains access to the data.

Sensors 412 include various accelerometers and gyroscopes located at IRU 304 that provide cross-runway acceleration 416, ground speed 310, track angle 312, and aircraft heading 314. Communication bus 414 is configured to be coupled to IRU 304, which provides the inertial data. Communication bus 414 is further coupled to various other data sources, such as a navigation system (not shown) that provides runway heading 308 and a radar altimeter 418 that provides altitude for aircraft 102. Communication bus 414 is further coupled to a left MMR 420 and a right MMR 422. Left MMR 420 provides a left MMR localizer deviation 424. Right MMR 422 provides a right MMR localizer deviation 426.

Communication interface 415 receives first and second localizer deviation signals indicative of respective localizer deviations, such as left MMR localizer deviation 424 and right MMR localizer deviation 426, computed based on the localizer transmission received by aircraft 102.

Flight control module 402 includes an automated landing system 428. Flight control module 402 receives and processes data from communication bus 414 to produce a localizer deviation signal that is used by automated landing system 428 to generate commands for actuator control module 404. Flight control module 402 receives left MMR localizer deviation 424 and right MMR localizer deviation 426 expressed in difference in the depth of modulation (ddm). Flight control module 402 includes amplifiers 430 and 432 that each apply a gain, $K_{ddm-degrees}$, to the ddm values to convert left MMR localizer deviation 424 and right MMR localizer deviation 426 to degrees.

Flight control module 402 includes a synthetic inertial localizer deviation module (SILD) processor 434 that computes an inertial localizer deviation 436, also referred to as a SILD, based on data received over communication bus 414. Inertial localizer deviation 436 is converted from feet to degrees by an amplifier 438 that applies a gain, $K_{feet-degrees}$. Flight control module 402 selects which localizer signal to use to command actuator control module 404 using a signal selection fault detection (SSFD) algorithm. Flight control module 402 includes a mid-value selector 440 for carrying out SSFD. Mid-value selector 440 is sometimes referred to as an SSFD module, which is configured to select one localizer deviation from among MMR localizer deviations 424 and 426, and inertial localizer deviation 436 for use in controlling automated landing system 428 of aircraft 102. Mid-value selector 440 selects a middle value from among left MMR localizer deviation 424, right MMR localizer deviation 426, and inertial localizer deviation 436. The selected localizer deviation 444 is converted from degrees to feet by an amplifier 442 and fed back to SILD processor 434. SILD processor 434 complementary-filters the selected localizer deviation and generates a complementary-filtered localizer deviation 446.

The addition of inertial localizer deviation 436 enables continued use of automated landing system 428 in the event of an undetected failure in one of left MMR 420 and right MMR 422 below an alert height, or altitude. Typically, the alert height is 200 feet. If one of left MMR localizer deviation 424 and right MMR localizer deviation 426 fails and is not respectively detected by left MMR 420 or right MMR 422, mid-value selector 440 detects the failure as the failed signal will be different from the two good signals. Generally, known systems utilize three MMRs, which add weight and cost to aircraft 102. When the two remaining good localizer deviation signals mis-compare, automated landing system 428 disengages and forfeits control of aircraft 102 to the pilot. Other known systems utilize two self-monitoring MMRs. In the event of an undetected failure in left MMR localizer deviation 424 or right MMR localizer deviation 426, the two signals mis-compare, but no third signal is available. Such a failure results in automated landing system 428 disengaging. Inertial localizer deviation 436 introduces a third localizer signal that enables flight control module 402 to withstand an undetected failure in one of left MMR localizer deviation 424 or right MMR localizer deviation 426.

Flight control module 402 may be embodied on one or more processors. Likewise, SILD processor 434, mid-value selector 440, and automated landing system 428 may be embodied on one or more processors configured to carry out the functionality described above.

Figure 5:
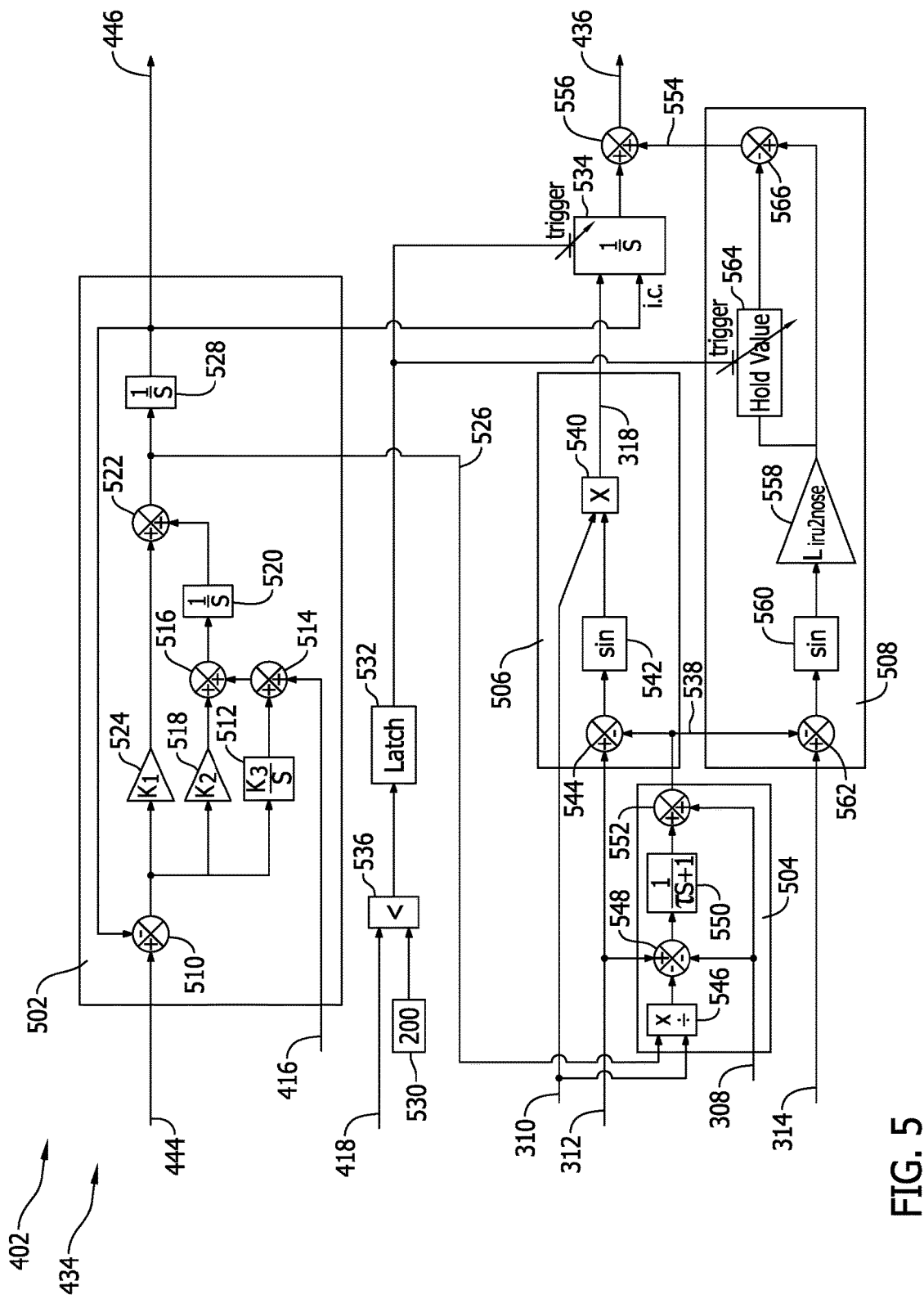
FIG. 5 is a functional block diagram of an exemplary flight control module for use in the flight control system shown in FIG. 4.

FIG. 5 is a functional block diagram of flight control module 402 and, more specifically, SILD processor 434, shown in FIG. 4. SILD processor 434 includes a complementary filter 502, a runway heading correction block 504, an inertial cross-runway velocity block 506, and a translation-to-GCP block 508.

Complementary filter 502 blends high-frequency content of inertial data from IRU 304 with low-frequency content of left MMR localizer deviation 424 and right MMR localizer deviation 426 to produce a smooth, complementary-filtered localizer deviation 446. Complementary filter 502 generally operates in terms of feet. Complementary-filtered localizer deviation 446, expressed in feet, is fed back and subtracted 510 from selected localizer deviation 444 to produce a localizer deviation error value. Mid-value selector 440 operates in terms of degrees or radians. Accordingly, selected localizer deviation 444 is converted to feet by gain 442 prior to use by complementary filter 502 to compute the localizer deviation error value. The localizer deviation error value is gained by $K_3$ and integrated 512. The result of integration 512 is added 514 to cross-runway acceleration 416, and then added 516 to the localizer deviation error value gained 518 by $K_2$. The result of summing 516 is integrated 520 and added 522 to the localizer deviation error value gained 524 by $K_1$. The result of summation 522 is a localizer deviation rate 526 that is integrated 528 to generate complementary-filtered localizer deviation 446. Complementary filter 502 is further characterized by, but not limited to the following equation, where $D_{CF}$ is complementary-filtered localizer deviation 446 as a function of time, t, and expressed in feet, $D_{sel}$ is is selected localizer deviation 444 as a function of time, t, and expressed in feet, and $A_{CR}$ is cross-runway acceleration 416 as a function of time, t.

$$D_{CF} = \left[\frac{K_1 S^2 + K_2 S + K_3}{S^3 + K_1 S^2 + K_2 S + K_3}\right] \times \qquad \text{EQ. 1}$$
$$D_{sel} + \left[\frac{S}{S^3 + K_1 S^2 + K_2 S + K_3}\right] \times A_{CR}$$

When aircraft 102 descends, as measured by radar altimeter 418, below an altitude threshold 530, complementary-filtered localizer deviation 446 is latched 532 as an initial condition for integration 534 of inertial cross-runway velocity 318. Aircraft altitude from radar altimeter 418 is compared 536 to altitude threshold 530, e.g., 200 feet, to trigger latch 532.

Inertial cross-runway velocity block 506 computes inertial cross-runway velocity 318 as a function of an adjusted runway heading 538, ground speed 310, and track 312. Inertial cross-runway velocity 318 is a projection of ground speed 310 along track 312 onto a cross-runway vector; computed as ground speed 310 multiplied 540 by the sine 542 of the difference 544 between track 312 and adjusted runway heading 538. Inertial cross-runway velocity block 506 is further characterized by, but not limited to, the following equation, where $V_{CR}$ is cross-runway velocity 318 as a function of time, t, $S_{GND}$ is ground speed 310 as a function of time, t, T is track 312 as a function of time, t, and $H_{run,adj}$ is adjusted runway heading 538 as a function of time, t, and expressed in radians.

$$V_{CR}(t) = S_{GND}(t) \times \sin(T(t) - H_{run,adj}(t)) \qquad \text{EQ. 2}$$

Runway heading correction block 504 computes adjusted runway heading 538 to correct for errors in magnetic runway heading 308 available on aircraft 102. Adjusted runway heading 538 represents actual runway azimuth relative to North for use in inertial cross-runway velocity block 506 and translation-to-GCP block 508. Adjusted runway heading 538 is computed as a function of magnetic runway heading 308, ground speed 310, track 312, and localizer deviation rate 526 from complementary filter 502. Localizer deviation rate 526 is derived from EQ. 1, above, and is a component of complementary-filtered localizer deviation 446. Localizer deviation rate 526 is a derivative of complementary-filtered localizer deviation 446, i.e., $S \times D_{CF}(t)$, and is represented by the following equation, where $D_{rate}$ is localizer deviation rate 526 as a function of time, t.

$$D_{rate} = \left[\frac{K_1 S^3 + K_2 S^2 + K_3 S}{S^3 + K_1 S^2 + K_2 S + K_3}\right] \times \qquad \text{EQ. 3}$$
$$D_{sel} + \left[\frac{S^2}{S^3 + K_1 S^2 + K_2 S + K_3}\right] \times A_{CR}$$

In runway heading correction block 504, localizer deviation rate 526 is divided 546 by ground speed 310 and subtracted 548, along with magnetic runway heading 308, from track 312. The result of subtraction 548 is lag-filtered 550, i.e., low-pass filtered, with a time constant, τ. The result of lag-filtering 550 is added 552 to magnetic runway heading 308 to generate adjusted runway heading 538. Runway heading correction block 504 is further characterized, but not limited to, the following equation, where $H_{run}$ is magnetic runway heading 308.

$$H_{run,adj} = \frac{\tau S}{\tau S + 1} \times H_{run} + \frac{1}{\tau S + 1} \times T - \frac{1}{\tau S + 1} \times \frac{D_{rate}}{S_{GND}} \quad \text{EQ. 4}$$

Integration 534 integrates cross-runway velocity 318 from an initial condition at altitude threshold 530, which is latched at complementary-filtered localizer deviation 446 with respect to GCP 302. Integration 534 produces inertial localizer deviation 436 with respect to IRU 304. A compensation 554 is added 556 to inertial localizer deviation 436 to correct for the difference between inertial localizer deviation 436 at IRU 304 and inertial localizer deviation 436 at GCP 302. For example, GCP 302, at the nose of aircraft 102, is at a different cross-runway position than IRU 304 during "crabbed" approaches for cross-wind landings. Compensation 554 accounts for changes in aircraft heading 314 that occur below altitude threshold 530, because integration 534 is initialized, at altitude threshold 530, to complimentary-filtered localizer deviation 446, which is computed with respect to GCP 302.

Translation-to-GCP block 508 computes compensation 554 as a function of aircraft heading 314, adjusted runway heading 538, and distance 306 along the fuselage of aircraft 102 between IRU 304 and GCP 302. Distance 306 is multiplied 558 by the sine 560 of a difference 562 between aircraft heading 314 and adjusted runway heading 538, yielding compensation 554 as a function of time, t. When aircraft 102 descends to altitude threshold 530, a hold value 564 of compensation 554 is latched 532. Hold value 564 represents the portion of compensation 554 already incorporated into inertial localizer deviation 436 via the initial condition of complementary-filtered localizer deviation 446 latched 532 at altitude threshold 530. Hold value 564 is subtracted 566 from compensation 554 to capture only the changes in aircraft heading 314 that occur below altitude threshold 530. Translation-to-GCP block 508 is further characterized, but not limited to, the following equation, where C is compensation 554 as a function of time, t, $L_{IRU-GCP}$ is distance 306 along the fuselage of aircraft 102 between IRU 304 and GCP 302, $H_{ac}$ is aircraft heading 314 as a function of time, t, and $t_{200}$ is the time at which aircraft 102 descends to altitude threshold 530.

$$C(t) = L_{IRU-GCP}[\sin(H_{ac}(t) - H_{run,adj}(t)) - \sin(H_{ac}(t_{200}) - H_{run,adj}(t_{200}))] \quad \text{EQ. 5}$$

Figure 6:
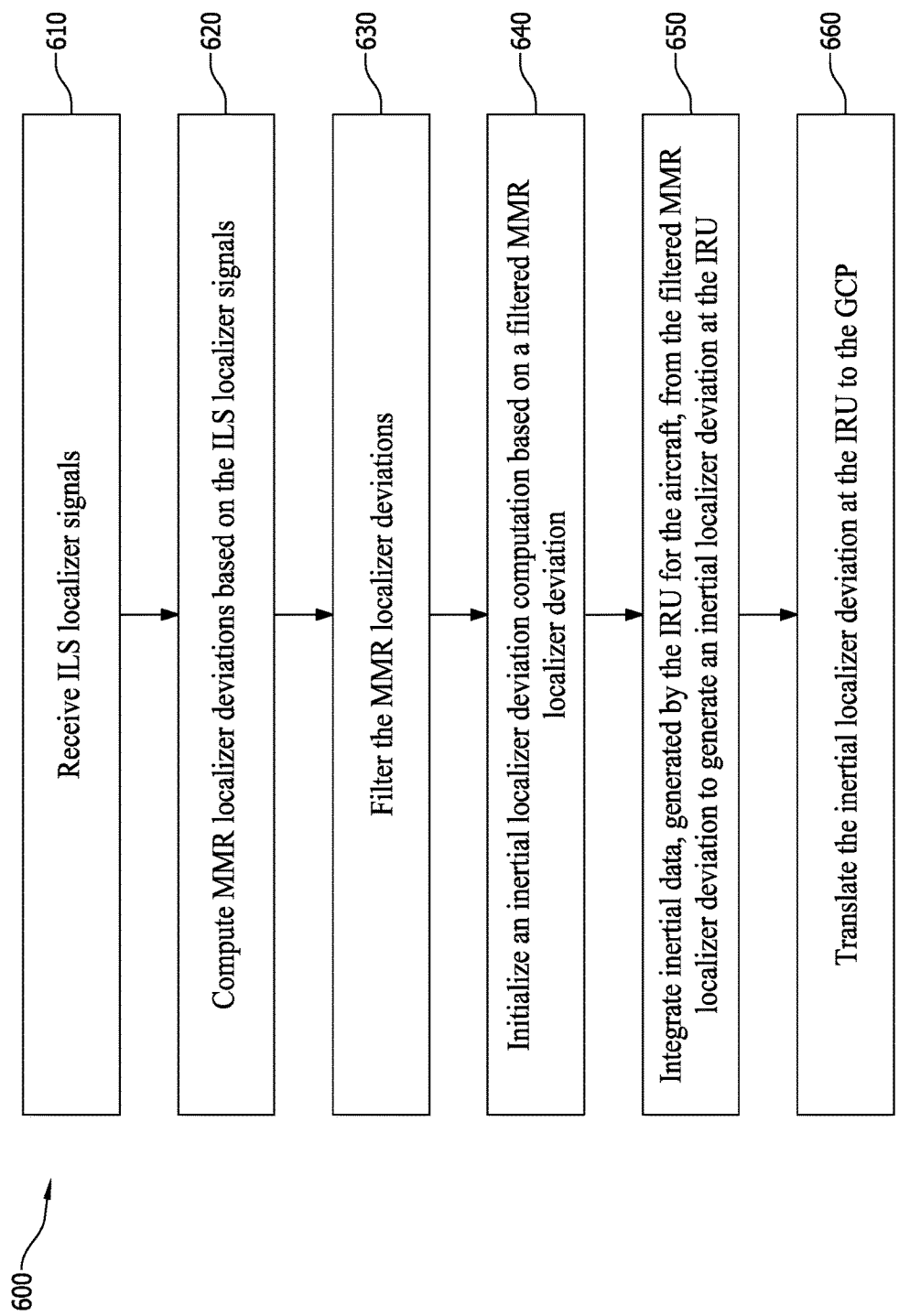
FIG. 6 is a flow diagram of an exemplary method of detecting a localizer deviation for use in the flight control system shown in FIG. 4.

FIG. 6 is a flow diagram of an exemplary method 600 of detecting a localizer deviation for use in flight control system 400, shown in FIG. 4, of aircraft 102, shown in FIGS. 1-3. Method 600 begins with aircraft 102 receiving 610 ILS localizer signals defined by first and second localizer beams 112 and 114. An antenna for receiving first and second localizer beams 112 and 114 is typically located in the nose of aircraft 102. The received signals are then passed to left MMR 420 and right MMR 422. Left MMR 420 and right MMR 422 respectively compute 620 MMR localizer deviations 424 and 426 based on the received ILS localizer signals. MMR localizer deviations 424 and 426 are transmitted onto a communication bus 414, such as an ARINC-429 bus, for example.

Flight control module 402 gains access to MMR localizer deviations 424 and 426 on communication bus 414 through communication interface 415, which may include an ARINC-429 interface circuit card configured to communicate within flight control module 402 using peripheral component interconnect (PCI), PCI Express, PC/104, Ethernet, compact PCI, or other suitable protocol. SILD processor 434 receives MMR localizer deviations 424 and 426 and filters 630 them using complementary filter 502 to produce complementary-filtered localizer deviation 446.

When aircraft 102 descends to altitude threshold 530, the inertial localizer deviation computation is initialized 640 based on complementary-filtered localizer deviation 446, which provides the initial condition for integration 534 of cross-runway velocity 318. Inertial data is integrated 650 to generate inertial localizer deviation 436 with respect to IRU 304. Inertial data includes cross-runway acceleration 416, track angle 312, ground speed 310, and aircraft heading 314, which are all determinable based on measurements at IRU 304.

Inertial localizer deviation 436 is translated 660 from IRU 304 to GCP 302 using translation-to-GCP block 508, which accounts for changes in aircraft heading 314 that occur below altitude threshold 530.

The above described embodiments of flight control systems for use by an aircraft during landing provide an inertial localizer deviation that is considered in combination with MMR localizer deviation signals when commanding an automated landing system. More specifically, the inertial localizer deviation provides assurance the automated landing system can continue an automated landing in the event of an undetected MMR localizer deviation failure. The flight control systems described herein and, more specifically, flight control modules, generate the inertial localizer deviation by integrating inertial data from the aircraft's IRU from an initial condition established based on the MMR localizer deviations.

Exemplary embodiments of methods, systems, and apparatus for flight control systems are not limited to the specific embodiments described herein, but rather, components of systems and/or steps of the methods may be utilized independently and separately from other components and/or steps described herein. For example, the methods may also be used in combination with other non-conventional flight control systems, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

An exemplary technical effect of the methods, systems, and apparatus described herein includes at least one of: (a) generation of a SILD for consideration in SSFD processes; (b) controlling an automated landing system based on a SILD; (c) improving reliability of automated landing systems through addition of an inertial localizer deviation; (d) improving failure detection in MMR localizer deviation signals; (e) reducing cost and weight of producing triple-redundant localizer deviation for automated landing systems through elimination of a third MMR device; and (f) improving localizer accuracy for automated landing systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flight control module for computing localizer deviation during landing of an aircraft, comprising:
   a communication interface configured to receive:
      first and second localizer deviation signals indicative of respective localizer deviations computed based on a localizer transmission received by said aircraft, and inertial data for said aircraft;
   a processor coupled to said communication interface and configured to compute an inertial localizer deviation based on the inertial data; and
   a single selection fault detection (SSFD) module configured to select one localizer deviation from among the respective localizer deviations and the inertial localizer deviation for use in controlling an automated landing system of said aircraft.

2. The flight control module of claim 1, wherein said SSFD module comprises a mid-value selector configured to select a middle value from among the respective localizer deviations and the inertial localizer deviation.

3. The flight control module of claim 1, wherein said processor comprises a complementary filter configured to generate a filtered localizer deviation based on a localizer deviation signal received through said communication interface and the inertial data, including a cross-runway acceleration.

4. The flight control module of claim 3, wherein said communication interface is configured to be coupled to an inertial reference unit (IRU) through a communication bus, the IRU comprising a ground speed sensor, a track angle sensor, and an aircraft heading sensor, and wherein the inertial data includes a ground speed, a track angle, and an aircraft heading.

5. The flight control module of claim 4, wherein said communication interface is further configured to receive a magnetic runway heading, and wherein said processor is further configured to compute an adjusted runway heading based on the magnetic runway heading, the ground speed, and a localizer deviation rate computed by said complementary filter.

6. The flight control module of claim 5, wherein said processor is further configured to:
   compute an inertial cross-runway velocity at the IRU based on the ground speed, the track angle, and the adjusted runway heading; and
   apply a correction to the inertial localizer deviation, the correction computed based on the adjusted runway heading, the aircraft heading, and a distance between the IRU and a guidance control point of said aircraft.

7. A flight control system for landing an aircraft, said flight control system comprising:
   a communication bus;
   first and second multi-mode receivers (MMRs) coupled to said communication bus and configured to:
      compute first and second localizer deviations, respectively, based on received localizer signals, and
      transmit first and second localizer deviation signals, respectively, indicative of the first and second localizer deviations onto said communication bus; and
   a flight control module coupled to said communication bus and configured to:
      receive inertial data for the aircraft and the first and second localizer deviation signals over said communication bus,
      compute an inertial localizer deviation based on the inertial data,
      select one localizer deviation from among the first and second localizer deviations and the inertial localizer deviation, and
      transmit the one localizer deviation to an automated landing system for said aircraft.

8. The flight control system of claim 7 further comprising an actuator control module coupled to said automated landing system through a second communication bus, said actuator control module communicably coupled to a flight control actuator, said automated landing system configured to instruct said actuator control module according to the one localizer deviation.

9. The flight control system of claim 7, wherein the flight control module is further configured to initialize an inertial localizer deviation computation when an altitude of said aircraft falls below a predetermined altitude.

10. The flight control system of claim 9 further comprising a radar altimeter configured to detect an altitude of said aircraft, said radar altimeter coupled to said communication bus, wherein said flight control module is further configured to initiate integration of the inertial data when the altitude falls below a predetermined threshold.

11. The flight control system of claim 10, wherein said flight control module is further configured to compute the inertial localizer deviation when the altitude falls below the predetermined threshold of 200 feet.

12. The flight control system of claim 10, wherein said flight control module is further configured to select a mid-value from among the first and second localizer deviations and the inertial localizer deviation as the one localizer deviation for transmission to said automated landing system.

13. The flight control system of claim 10, wherein said flight control module is further configured to initialize computation of the inertial localizer deviation based on the first and second localizer deviation signals when said aircraft descends below 200 feet in altitude, wherein the first and second localizer deviation signals are complementary-filtered prior to initialization.

14. The flight control system of claim 7, wherein the flight control module further comprises a complementary filter configured to filter a selected localizer deviation signal based on inertial data including cross-runway acceleration.

15. The flight control system of claim 7, wherein the flight control module is further configured to translate the inertial localizer deviation to a guidance control point (GCP) for the aircraft.

16. A method of detecting a localizer deviation for an aircraft during landing, said method comprising:
    receiving instrument landing system (ILS) localizer signals;
    computing, by first and second multi-mode receivers (MMRs), respective MMR localizer deviations based on the ILS localizer signals;
    filtering the respective MMR localizer deviations;
    initializing an inertial localizer deviation computation, the initializing comprising latching a filtered MMR localizer deviation upon an altitude of the aircraft falling below a predetermined threshold;
    integrating inertial data, generated by an inertial reference unit (IRU) for the aircraft, from the filtered MMR localizer deviation to generate an inertial localizer deviation at the IRU; and
    translating the inertial localizer deviation at the IRU to a guidance control point (GCP).

17. The method of claim 16, wherein filtering the respective MMR localizer deviations comprises blending a cross-runway acceleration measured by the IRU, with the respective MMR localizer deviations using a complementary filter.

18. The method of claim 16, wherein integrating the inertial data generated by the IRU comprises:
    computing inertial cross-runway velocity based on ground speed and track angle measured by the IRU, and a runway heading; and
    integrating the inertial cross-runway velocity from the filtered MMR localizer deviation to generate the inertial localizer deviation at the IRU.

19. The method of claim 18, wherein integrating the inertial data generated by the IRU further comprises:
    computing an error correction for runway heading based on the ground speed, the track angle, and a localizer deviation rate, the localizer deviation rate computed based on the respective MMR localizer deviations; and
    applying the error correction to a magnetic runway heading to generate an adjusted runway heading for use in computing the inertial cross-runway velocity and in translating the inertial localizer deviation at the IRU to the GCP.

20. The method of claim 16, wherein translating the inertial localizer deviation at the IRU to the GCP comprises:
    computing a cross-runway position difference between the IRU and the GCP based on an aircraft heading measured by the IRU and a runway heading; and
    adding the cross-runway position difference to the inertial localizer deviation at the IRU to generate an inertial localizer deviation at the GCP.

* * * * *

UNITED STATES PATENT AND TRADEMARK OFFICE
CERTIFICATE OF CORRECTION

PATENT NO. : 10,175,694 B2
APPLICATION NO. : 15/340318
DATED : January 8, 2019
INVENTOR(S) : Robert E. McLees et al.

It is certified that error appears in the above-identified patent and that said Letters Patent is hereby corrected as shown below:

In the Claims

In Column 9, Line 50, in Claim 1, delete "single" and insert therefor -- signal --.

Signed and Sealed this
Twenty-fourth Day of November, 2020

Andrei Iancu
*Director of the United States Patent and Trademark Office*